(12) United States Patent
Hashimoto

(10) Patent No.: US 10,159,899 B2
(45) Date of Patent: Dec. 25, 2018

(54) VIDEO GAME PROCESSING PROGRAM, VIDEO GAME PROCESSING SYSTEM AND VIDEO GAME PROCESSING METHOD

(71) Applicant: Tokyo RPG Factory Co., Ltd., Tokyo (JP)

(72) Inventor: Atsushi Hashimoto, Tokyo (JP)

(73) Assignee: TOKYO RPG FACTORY CO., LTD., Tokyo (JP)

( * ) Notice: Subject to any disclaimer, the term of this patent is extended or adjusted under 35 U.S.C. 154(b) by 0 days.

(21) Appl. No.: 15/350,495

(22) Filed: Nov. 14, 2016

(65) Prior Publication Data

US 2017/0136358 A1    May 18, 2017

(30) Foreign Application Priority Data

Nov. 18, 2015    (JP) .................................. 2015-226087

(51) Int. Cl.
*A63F 9/24* (2006.01)
*A63F 13/00* (2014.01)
(Continued)

(52) U.S. Cl.
CPC .............. *A63F 13/52* (2014.09); *A63F 13/25* (2014.09); *A63F 13/335* (2014.09); *A63F 13/35* (2014.09);
(Continued)

(58) Field of Classification Search
CPC ........ A63F 13/52; A63F 13/25; A63F 13/335; A63F 13/35
See application file for complete search history.

(56) References Cited

U.S. PATENT DOCUMENTS

| 5,390,937 A | 2/1995 | Sakaguchi et al. |
| 5,649,862 A | 7/1997 | Sakaguchi et al. |

(Continued)

FOREIGN PATENT DOCUMENTS

| JP | 2794230 | 6/1998 |
| JP | 2007-296108 | 11/2007 |

OTHER PUBLICATIONS

Office Action from Japan Patent Office (JPO) in Japanese Patent Appl. No. 2017-078911, dated Apr. 17, 2018, together with a partial English language translation.
(Continued)

*Primary Examiner* — Kevin Y Kim
(74) *Attorney, Agent, or Firm* — Greenblum & Bernstein, P.L.C.

(57) ABSTRACT

A non-transitory computer-readable medium including a video game processing program product for causing a user terminal to realize functions to control progress of a video game in response to an operation of a user is provided. The functions include: a time measuring function configured to measure an elapsed time for a character on the basis of the elapsed time, the character starting an action; a first updating function configured to update information regarding a gauge, the gauge representing the elapsed time measured by the time measuring function; a second updating function configured to update information regarding a gauge, the gauge representing a value to be increased in a case where a predetermined condition is satisfied, the predetermined condition including a condition that at least the first gauge is in a predetermined state; and a displaying function configured to display a game screen on a display screen of a display device.

13 Claims, 11 Drawing Sheets

(51) Int. Cl.

| | |
|---|---|
| *G06F 17/00* | (2006.01) |
| *G06F 19/00* | (2018.01) |
| *A63F 13/52* | (2014.01) |
| *A63F 13/25* | (2014.01) |
| *A63F 13/35* | (2014.01) |
| *A63F 13/335* | (2014.01) |
| *H04L 29/06* | (2006.01) |

(52) U.S. Cl.
CPC ......... *A63F 2300/407* (2013.01); *H04L 67/38* (2013.01)

(56) References Cited

U.S. PATENT DOCUMENTS

| | | | |
|---|---|---|---|
| RE37,948 E | 12/2002 | Sakaguchi et al. | |
| 2001/0041329 A1* | 11/2001 | Legarda | A63F 13/10 434/236 |
| 2003/0236111 A1* | 12/2003 | Otani | A63F 13/10 463/8 |
| 2007/0265045 A1 | 11/2007 | Takai | |

OTHER PUBLICATIONS

"Final Fantasy XIII", Dengeki Games vol. 3, ASCII Media Works Inc., Jan. 1, 2010, vol. 10, No. 1, p. 21, together with a partial English language translation.

"John Woo Presents Strangle Hold", Famitsu Xbox 360, Enterbrain Inc., Jun. 1, 2008, vol. 7, No. 6, p. 75, together with a partial English language translation.

\* cited by examiner

GAME RELATED INFORMATION

|  |  | CHARACTER A | CHARACTER B | CHARACTER C | ... |
|---|---|---|---|---|---|
| FIRST GAUGE | ELAPSED TIME | xx:xx | xx:xx | xx:xx | ... |
| SECOND GAUGE | SPECIAL VALUE | xx:xx | xx:xx | xx:xx | ... |
|  | ACCUMULATED VALUE | – | – | – | ... |
| ⋮ | ⋮ | ⋮ | ⋮ | ⋮ | ⋮ |

VIDEO GAME PROCESSING PROGRAM, VIDEO GAME PROCESSING SYSTEM AND VIDEO GAME PROCESSING METHOD

CROSS-REFERENCE TO RELATED APPLICATION

The present application relates to subject matter contained in Japanese Patent Application No. 2015-226087 field on Nov. 18 2015, the disclosure of which is expressly incorporated herein by reference in its entirety.

BACKGROUND OF THE INVENTION

1. Field of the Invention

At least one of embodiments according to the present invention relates to a non-transitory computer-readable medium including a video game processing program, a video game processing system, and a video game processing method for causing a user terminal to realize functions to control progress of a video game in response to an operation of a user.

2. Description of the Related Art

Heretofore, in a field of a video game, there is a system in which times defined for characters are respectively measured and a character is caused to operate when a predetermined time elapses.

As such a system, for example, a so-called Active Time Battle System (hereinafter, referred to as an "ATB system") is widely known (see Japanese Patent No. 2,794,230B). In such a system, a gauge is often displayed in order to cause a user to recognize a measured time. Here, the gauge is used to cause the user to view the measured time to an extent to coincide with a predetermined time. A configuration of the gauge is not limited particularly. However, there are configurations in which the inside of a frame of a gauge is gradually filled and the gauge represents that measurement of a predetermined time is completed when the frame is filled up (that is, when the gauge is filled up).

However, in the conventional system, there has been a case where a configuration of a video game becomes monotony because only one gauge representing a measured time is prepared for one character. As a result, this causes interest of the ATB system to be lowered.

SUMMARY OF THE INVENTION

It is an object of at least one of embodiments according to the present invention to solve the problem described above, and to improve interest of an ATB system.

According to one non-limiting aspect of one embodiment of the present invention, there is provided a non-transitory computer-readable medium including a video game processing program product for causing a user terminal to realize functions to control progress of a video game in response to an operation of a user.

The functions include a time measuring function configured to measure an elapsed time for a character on the basis of the elapsed time, the character starting an action.

The functions also include a first updating function configured to update information regarding a gauge (hereinafter, referred to as a "first gauge"), the first gauge representing the elapsed time measured by the time measuring function.

The functions also include a second updating function configured to update information regarding a gauge (hereinafter, referred to as a "second gauge"), the second gauge representing a value to be increased in a case where a predetermined condition is satisfied, the predetermined condition including a condition that at least the first gauge is in a predetermined state.

The functions also include a displaying function configured to display a game screen on a display screen of a display device, at least one of the first gauge and the second gauge being included in the game screen.

According to another non-limiting aspect of one embodiment of the present invention, there is provided a video game processing system for controlling progress of a video game in response to an operation of a user, the video game processing system including a communication network, a server, and a user terminal.

The video game processing system includes a time measuring section configured to measure an elapsed time for a character on the basis of the elapsed time, the character starting an action.

The video game processing system also includes a first updating section configured to update information regarding a gauge (hereinafter, referred to as a "first gauge"), the first gauge representing the elapsed time measured by the time measuring function.

The video game processing system also includes a second updating section configured to update information regarding a gauge (hereinafter, referred to as a "second gauge"), the second gauge representing a value to be increased in a case where a predetermined condition is satisfied, the predetermined condition including a condition that at least the first gauge is in a predetermined state.

The video game processing system also includes a displaying section configured to display a game screen on a display screen of a display device, at least one of the first gauge and the second gauge being included in the game screen.

According to still another non-limiting aspect of the present invention, there is provided a video game processing method of controlling progress of a video game in response to an operation of a user.

The video game processing method includes a time measuring process configured to measure an elapsed time for a character on the basis of the elapsed time, the character starting an action.

The video game processing method also includes a first updating process configured to update information regarding a gauge (hereinafter, referred to as a "first gauge"), the first gauge representing the elapsed time measured in the time measuring process.

The video game processing method also includes second updating process configured to update information regarding a gauge (hereinafter, referred to as a "second gauge"), the second gauge representing a value to be increased in a case where a predetermined condition is satisfied, the predetermined condition including a condition that at least the first gauge is in a predetermined state.

The video game processing method also includes a displaying process configured to display a game screen on a display screen of a display device, at least one of the first gauge and the second gauge being included in the game screen.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like does not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like does not occur in the content of the processing.

(First Embodiment)

Figure 1:
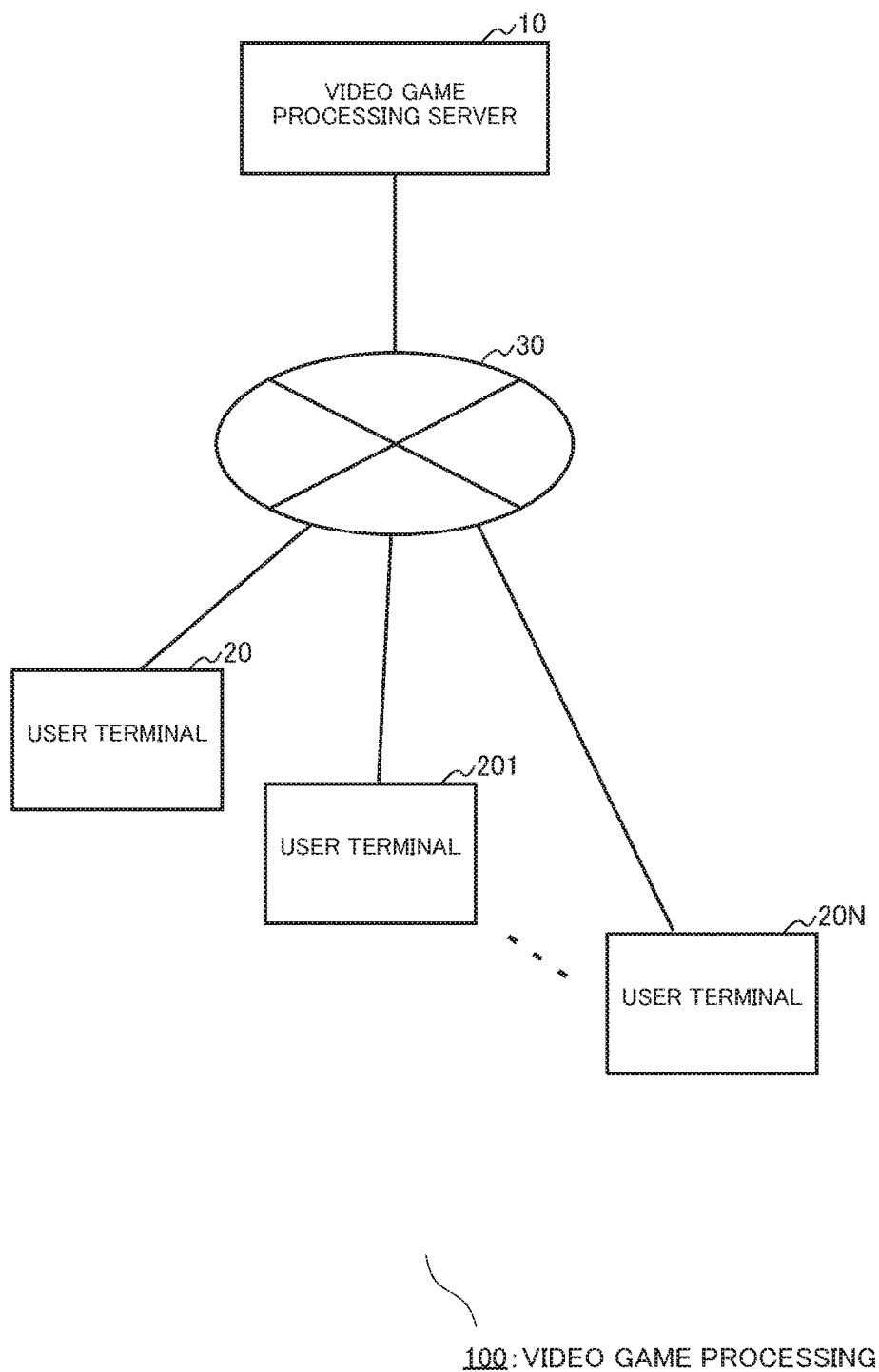
FIG. 1 is a block diagram showing an example of a configuration of a video game processing system corresponding to at least one of embodiments according to the present invention.

FIG. 1 is a block diagram showing an example of a configuration of a video game processing system 100 according to one embodiment of the present invention. As shown in FIG. 1, the video game processing system 100 (hereinafter, referred to also as a "system 100") includes a video game processing server 10 (hereinafter, referred to as a "server 10") and user terminals 20 and 201 to 20N ("N" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The system 100 includes the server 10 and the plurality of user terminals 20 and 201 to 20N, whereby various kinds of functions for carrying out various kinds of processing in response to an operation of the user is realized.

The server 10 is managed by an administrator of the system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processing as a computer, such as a control section and a communicating section. However, its explanation herein is omitted. Further, in the system 100, it is preferable that the server 10 manages various kinds of information from a point of view to reduce a processing load on each of the plurality of user terminals 20 and 201 to 20N. However, a storing section for storing various kinds of information may include a storage region in a state that the server 10 can access the storage region. For example, the server 10 may be configured so as to be provided with a dedicated storage region outside the server 10.

Figure 2:
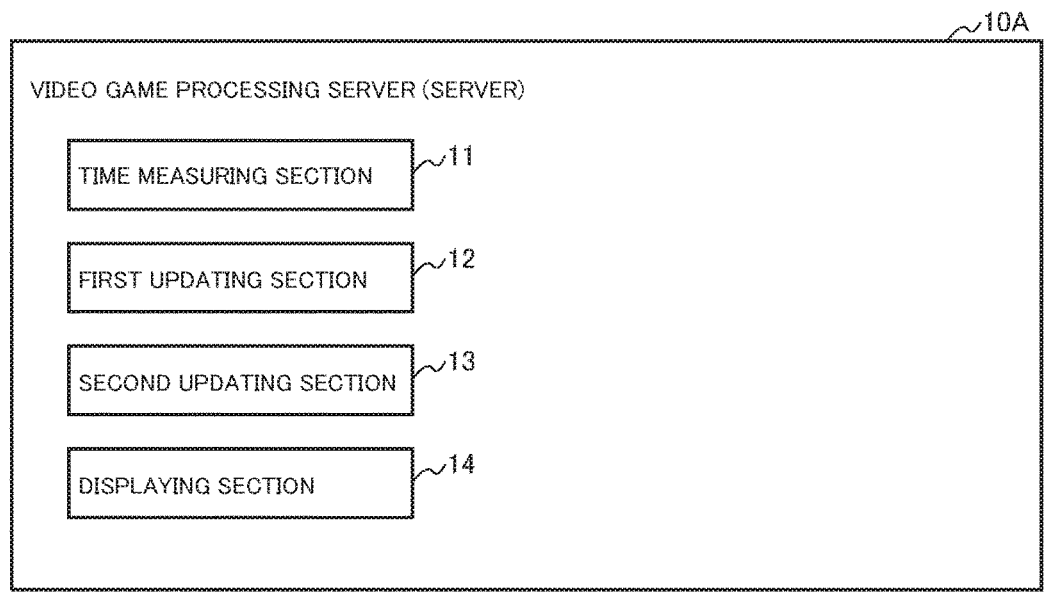
FIG. 2 is a block diagram showing a configuration of a video game processing server corresponding to at least one of the embodiments according to the present invention.

FIG. 2 is a block diagram showing a configuration of a video game processing server 10A (hereinafter, referred to as a "server 10A"), which is an example of the configuration of the video game processing server 10. As shown in FIG. 2, the server 10A at least includes a time measuring section 11, a first updating section 12, a second updating section 13, and a displaying section 14.

The time measuring section 11 has a function to measure an elapsed time for a character that starts an action on the basis of the elapsed time.

Here, the elapsed time means a time that elapses since start timing for which a predetermined condition is set up. Namely, the phrase "measure an elapsed time" means that a time elapsing from a time when the predetermined condition is satisfied is measured. In this regard, the content of the predetermined condition is not limited particularly so long as it is one regarding a video game.

Further, the phrase "start an action on the basis of the elapsed time" means that the character carries out an action on the basis of a situation that an elapsed time becomes one condition. Namely, a start condition for the action is not limited particularly. For example, the server 10A may be configured so as to allow the user to input a command on the basis of a predetermined lapse of time. The server 10A may be configured so as to carry out a command, which was already received, when the elapsed time reaches a predetermined time. In this regard, in the present embodiment, when the action of the character is completed, measurement of the elapsed time is started newly.

The first updating section 12 has a function to update information regarding a gauge (hereinafter, referred to as a "first gauge"), which represents the elapsed time measured by the time measuring section 11.

Here, a configuration to represent the elapsed time by means of the gauge is not limited particularly. However, it is preferable that the user can recognize timing when the character starts to carry out an action or timing when the user can input an action instruction.

Further, a configuration of information regarding the first gauge (hereinafter, referred to as "first gauge information") is not limited particularly so long as the information is information for displaying the first gauge. As an example of the first gauge information, there is information in which the measured elapsed time is associated with a remaining time until start of the action. In this regard, the server 10A may be configured so as to manage the elapsed time as a point using a predetermined rule.

The second updating section 13 has a function to update information regarding a gauge (hereinafter, referred to as a "second gauge"), which represents a value (hereinafter, referred to also as a "special value" in order to distinguish the value from other value that may appear in the video game) to be increased in a case where a predetermined condition is satisfied. The predetermined condition includes a condition that at least the first gauge is in a predetermined state.

Here, a configuration to represent the special value by means of a gauge is not limited particularly. However, it is preferable that it is a configuration in which the user can identify the first gauge and the second gauge.

Further, a configuration to increase the special value is not limited particularly. However, it is preferable that it is a configuration in which the user can recognize an increase rule. As examples of the configuration to increase the special value, there are a configuration in which the special value is increased together with the first gauge, and a configuration in which the first gauge stops at the predetermined state but the special value is increased instead of this.

The displaying section 14 has a function to display, on a display screen of a display device, a game screen that includes at least one of the first gauge and the second gauge.

Here, the game screen means a screen representing a virtual space (or a game space). In this regard, in the present embodiment, various kinds of elements constituting the game screen may be called as an image. A configuration of the game screen is not limited particularly so long as it is a configuration in which the user can recognize a status of the video game.

Further, the phrase "display the game screen on the display screen of the display device" means that the game screen is outputted onto the display device included in the user terminal 20 or the like by means of communication using the communication network 30. As an example of a configuration to cause the display device to display the game screen, there is a configuration in which information generated at the server side (hereinafter, referred to as "output information") is transmitted to the terminal side. In this regard, a configuration of the output information is not limited particularly. For example, it may be information in which an image is compressed, or information for causing the terminal side to generate an image. As an example of the information in which the image is compressed, there is one used in a cloud game (for example, MPEG). Further, as information for generating an image at the terminal side, there is one used in an online game (for example, positional information of an object).

Each of the plurality of user terminals 20 and 201 to 20N is managed by ab user, and is configured by a terminal, such as a cellular phone terminal, a PDA (Personal Digital Assistants) and a mobile game device, by which the user can play a network delivery type game, such as a cellular phone terminal, a PDA (Personal Digital Assistants), and a mobile game device, by which the user can play a network delivery type game, for example. In this regard, a configuration of the user terminal that the video game processing system 100 can include is not limited to the example described above. It may be a configuration in which the user can recognize the video game. As the other example of the configuration of the user terminal, there is a so-called wearable divide such as a smart watch, a combination of the wearable device and the communication terminal, and the like.

Further, each of the plurality of user terminals 20 and 201 to 20N is connected to the communication network 30, and includes hardware (for example, a display device for displaying a browser screen according to a coordinate, and a game screen, and the like) and software for carrying out various kinds of processes by communicating with the server 10. In this regard, each of the plurality of user terminals 20 and 201 to 20N may be configured so as to be capable of directly communicating with each other without the server 10.

Next, an operation of the video game processing system 100 (the system 100) according to the present embodiment will be described.

Figure 3:
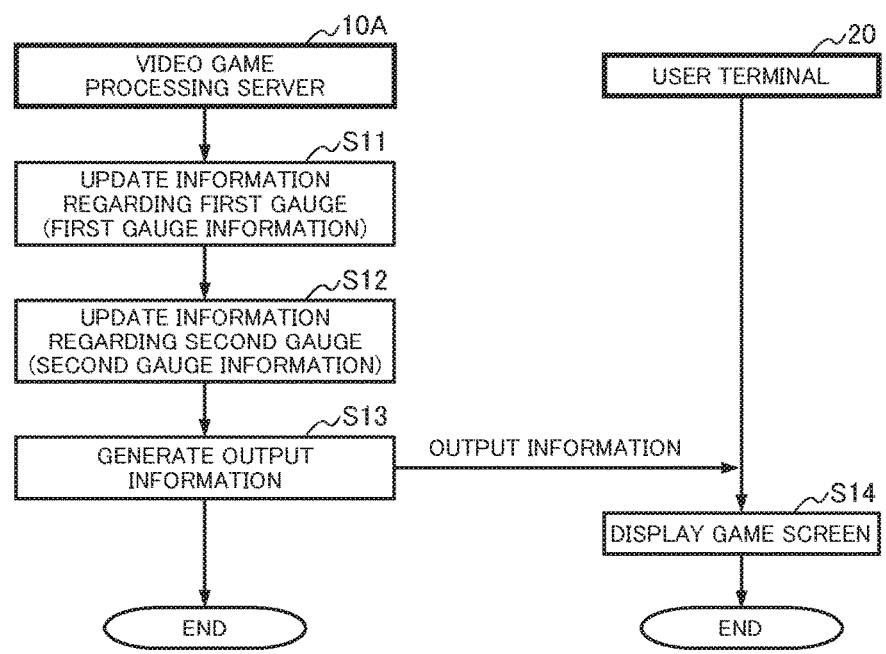
FIG. 3 is a flowchart showing an example of game processing corresponding to at least one of the embodiments according to the present invention.

FIG. 3 is a flowchart showing an example of game processing carried out by the system 100. In the game processing according to the present embodiment, processing related to a situation that a game screen according to an elapsed time is displayed is carried out. Hereinafter, the case where the server 10A and the user terminal 20 (hereinafter, referred to as a "terminal 20") carry out the game processing will be described as an example.

The game processing is started when a condition to start measuring a time (hereinafter, referred to as a "time measuring start condition") is satisfied, for example. Hereinafter, the case where the time measuring start condition is satisfied in a battle between a player character and an enemy character will be described as an example.

In the game processing, the server 10A first updates information regarding the first gauge (the first gauge information). In the present embodiment, the server 10A updates the first gauge information so that the first gauge represents a time that is measured from a time when the time measuring start condition is satisfied.

When the first gauge information is updated, the server 10A updates information regarding the second gauge (hereinafter, referred to as "second gauge information") (Step S12). In the present embodiment, the server 10A updates the second gauge information so that the second gauge represents the special value to be increased in a case where the first gauge becomes the predetermined state.

When the second gauge information is updated, the server 10A generates output information on the basis of the information after update (Step S13). In the present embodiment, the server 10A generates information (the output information) for causing the terminal 20 to display a game screen, which includes the first gauge and the second gauge, on the basis of the updated information, and transmits the output information thus generated to the terminal 20.

The terminal 20 causes the display device included therein to display a game screen on the display screen on the basis of the output information received from the server 10A (Step S14), and terminated the processing herein.

Figure 4:
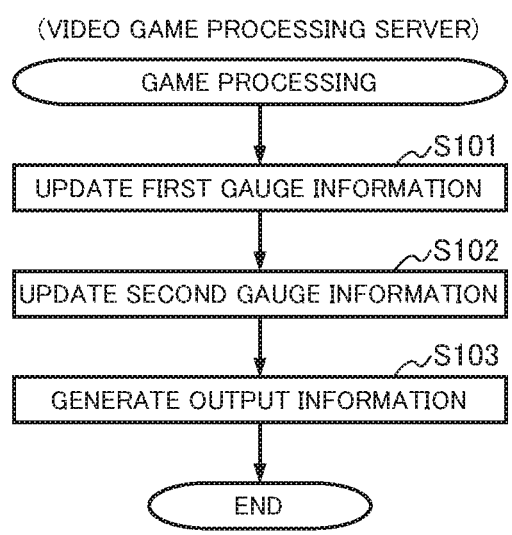
FIG. 4 is a flowchart showing an example of an operation of a server side in the game processing corresponding to at least one of the embodiments according to the present invention.

FIG. 4 is a flowchart showing an example of an operation of the server 10A side in the game processing. Here, an operation of the server 10A in the system 100 will be described again.

In the game processing, the server 10A first updates the first gauge information (Step S101), and updates the second gauge information (Step S102). The server 10A generates the output information on the basis of the information after update (Step S103). In the present embodiment, the server 10A transmits the output information thus generated to the terminal 20.

Figure 5:
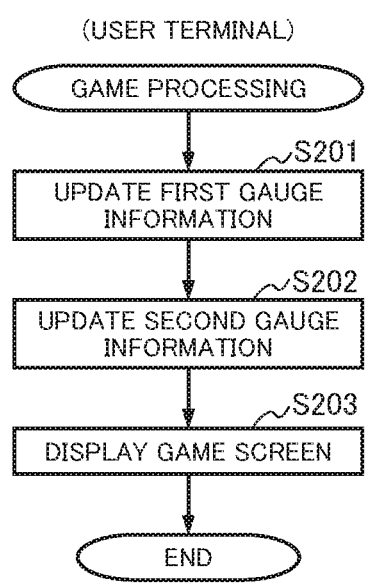
FIG. 5 is a flowchart showing an example of an operation of a terminal side in the game processing corresponding to at least one of the embodiments according to the present invention.

FIG. 5 is a flowchart showing an example of an operation of the terminal 20 side in a case where the terminal 20 carries out the game processing. Hereinafter, the case where the terminal 20 carries out the game processing by a single body will be described as an example. In this regard, a configuration of the terminal 20 includes similar functions to the configuration of the server 10 except that the terminal 20 receives various kinds of information from the server 10. For this reason, its description is omitted from a point of view to avoid repeated explanation.

The terminal 20 measures the elapsed time, and updates the first gauge information (Step S201). In the present embodiment, the terminal 20 measures the elapsed time until the first gauge is filled up, and updates the first gauge information so that the user can recognize the measured elapsed time.

When the first gauge information is updated, the terminal 20 updates the second gauge information (Step S202). In the present embodiment, the terminal 20 updates the second gauge information in accordance with a predetermined rule until the first gauge information is not in a predetermined state after the first gauge information became the predetermined state.

When the second gauge information is updated, the terminal 20 displays a game screen on the basis of the updated information (Step S203). In the present embodiment, the terminal 20 causes the display device included therein to display, on the display screen, a game screen that includes the first gauge according to update of the first gauge information and the second gauge according to update of the second gauge information.

As explained above, as one side of the first embodiment, the server 10A provided with the functions to control progress of the video game in response to an operation of the user is configured so as to include the time measuring section 11, the first updating section 12, the second updating section 13, and the displaying section 14. Thus, the elapsed time of the character that starts an action is measured on the basis of the elapsed time; the information regarding the gauge representing the measured elapsed time (the first gauge) is updated; the information regarding the gauge representing the value to be increased in a case where the predetermined condition including the condition that at least the first gauge is in the predetermined state is satisfied (the second gauge) is updated; and the display device is caused to display, on the display screen, the game screen including at least one of the first gauge and the second gauge. Therefore, it is possible to improve interest of the ATB system.

Namely, in the system in which the character carries out an action on the basis of the elapsed time, like the ATB system, it becomes possible to provide the user with the video game in which other gauge related to a gauge is used in addition to the gauge that represents the elapsed time related to the action of the character. Therefore, it is possible to improve interest compared with one including only one gauge like the conventional technique.

(Second Embodiment)

Figure 6:
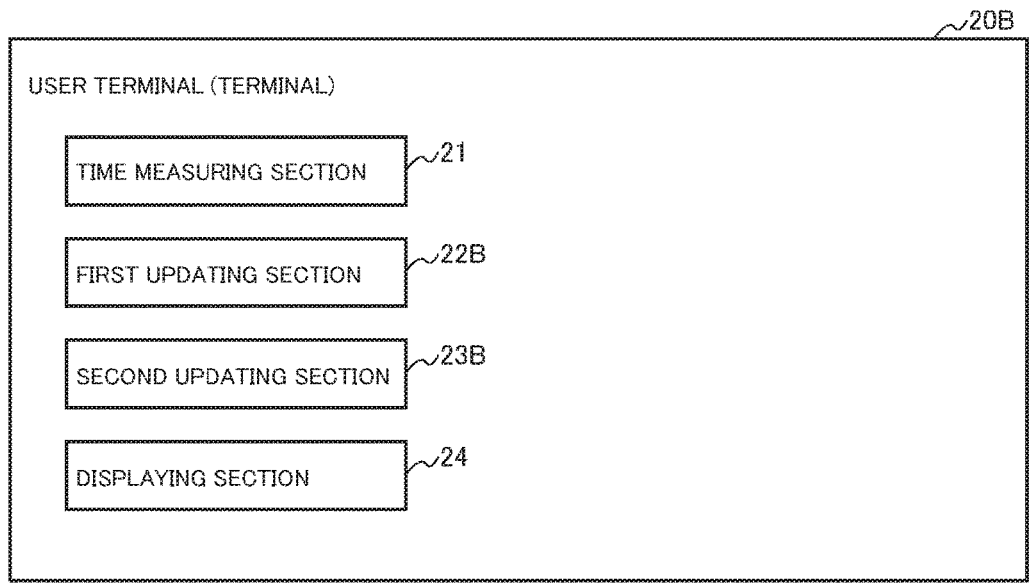
FIG. 6 is a block diagram showing a configuration of a user terminal corresponding to at least one of the embodiments according to the present invention.

FIG. 6 is a block diagram showing a configuration of a user terminal 20B (hereinafter, referred to as a "terminal 20B"), which is an example of the user terminal 20. In the present embodiment, the terminal 20B at least includes a time measuring section 21, a first updating section 22B, a second updating section 23B, and a displaying section 24.

The first updating section 22B has a function to reduce an elapsed time on the basis of a situation that an action starting request for a character is received.

Here, a configuration to receive the action starting request is not limited particularly. The configuration may be configured so as to receive the action starting request without requiring an operation of the player when the character satisfies a condition. Alternatively, configuration may be configured so as to receive the action starting request by means of an operation of the player. Further, the configuration may be configured so as to receive the action starting request only in a case where the elapsed time is a predetermined time or more.

Further, a configuration to reduce the elapsed time is not limited particularly. For example, the terminal 20B may be configured so as to reduce the elapsed time by a fixed time. Alternatively, the terminal 20B may be configured so as to reduce the elapsed time by a time defined in advance for the content of the received action starting request (that is, a kind of the action of the character).

The second updating section 23B has a function to increase a value (hereinafter, referred to as a "special value"), which is represented by the second gauge in accordance with a predetermined rule after the elapsed time represented by the first gauge became the predetermined time or until the elapsed time became less than the predetermined time.

Here, a configuration of the predetermined rule is not limited particularly. However, it is preferable that the special value is gradually increased up to a predetermined value.

Figure 7:
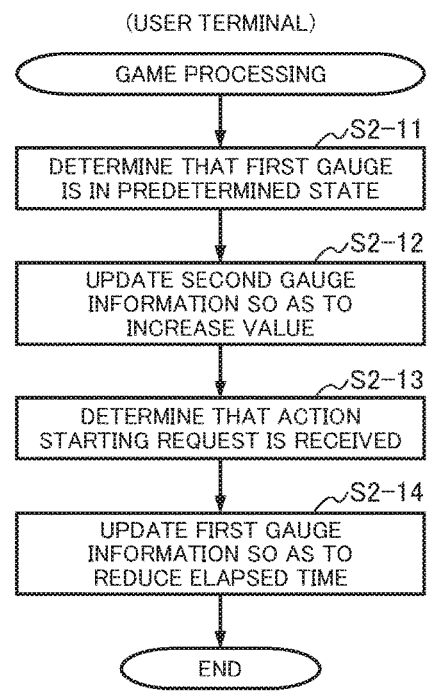
FIG. 7 is a flowchart showing an example of the game processing corresponding to at least one of the embodiments according to the present invention.

FIG. 7 is a flowchart showing an example of the game processing carried out by the terminal 20. Hereinafter, an operation of the terminal 20B will be described as an example. In this regard, an operation of the terminal 20B with the server 10 is omitted from a point of view to avoid repeated explanation.

In a case where it is determined that the first gauge is in a predetermined state (Step S2-11), the terminal 20B updates second gauge information so as to increase a value represented by the second gauge (the special value) (Step S2-12). In the present embodiment, the terminal 20B increases the special value in accordance with the predetermined rule in a case where the elapsed time becomes shorter than the predetermined time after the elapsed time represented by the first gauge became the predetermined time or until the special value became a state set up as an unincreasable value.

On the other hand, in a case where it is determined that the action starting request is received (Step S2-13), the terminal 20B updates first gauge information so as to reduce the elapsed time represented by the first gauge (Step S2-14). In the present embodiment, the terminal 20B reduces the elapsed time corresponding to the first gauge by an amount according to the received action starting request.

As explained above, as one side of the second embodiment, the user terminal 20B is configured so as to include the first updating section 22B and the second updating section 23B. Thus, the elapsed time is reduced on the basis of a situation that the action starting request for the character is received; and the value is increased in accordance with the predetermined rule until the elapsed time becomes less than the predetermined time after the elapsed time became the predetermined time. Therefore, it is possible to give the user a motive to consider states of the first gauge and the second gauge.

(Third Embodiment)

Figure 8:
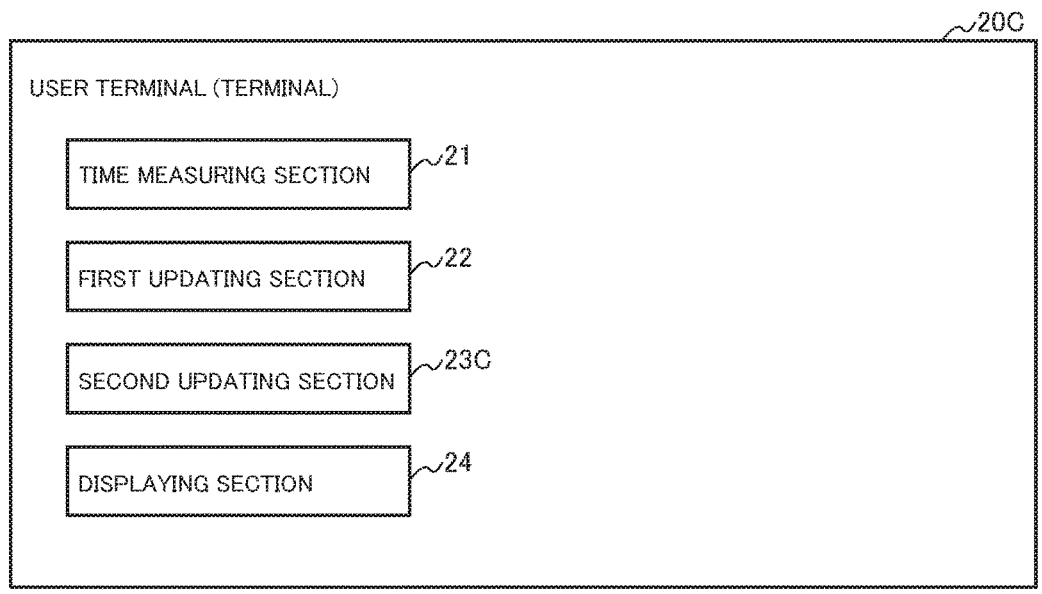
FIG. 8 is a block diagram showing a configuration of the user terminal corresponding to at least one of the embodiments according to the present invention.

FIG. 8 is a block diagram showing a configuration of a user terminal 20C (hereinafter, referred to as a "terminal 20C"), which is an example of the user terminal 20. In the present embodiment, the terminal 20C at least includes a time measuring section 21, a first updating section 22, a second updating section 23C, and a displaying section 24.

The second updating section 23C has a function to increase a value represented by a second gauge (hereinafter, referred to as a "special value") by an amount calculated in accordance with a lapse of time on the basis of a situation that a predetermined condition is satisfied.

Here, a configuration to increase the special value is not limited particularly. However, it is preferable that it is a configuration in which the user can recognize that the special value increases in accordance with the lapse of time.

Figure 9:
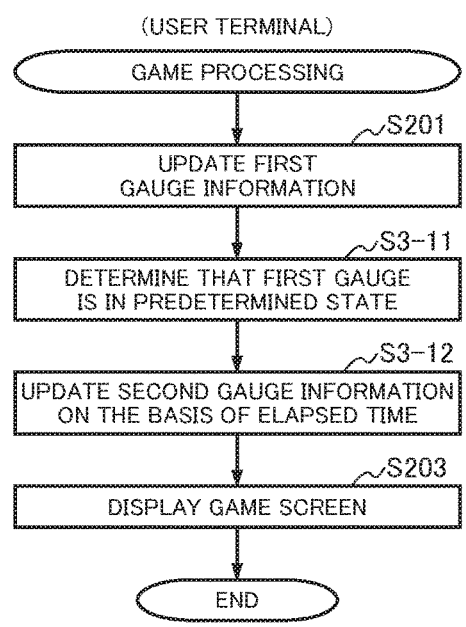
FIG. 9 is a flowchart showing an example of the game processing corresponding to at least one of the embodiments according to the present invention.

FIG. 9 is a flowchart showing an example of the game processing carried out by the terminal 20. Hereinafter, an operation of the terminal 20C will be described as an example. In this regard, an operation of the terminal 20C with the server is omitted from a point of view to avoid repeated explanation.

In a case where it is determined that the first gauge is in a predetermined state (Step S3-11), the terminal 20C updates second gauge information on the basis of an elapsed time (Step S3-12). In the present embodiment, the terminal 20C calculates an increase amount on the basis of the elapsed time measured after the first gauge becomes the predetermined state, and increases the special value by the calculated increase amount.

As explained above, as one side of the third embodiment, the user terminal 20C is configured so as to include the second updating section 23C. Thus, the special value is increased by the amount calculated in accordance with the lapse of time on the basis of a situation that the predetermined condition is satisfied, and the second gauge is also increased on the basis of the elapsed time. Therefore, the lapse of time can be caused to influence on the video game further, and this makes it possible to enhance interest.

(Fourth Embodiment)

Figure 10:
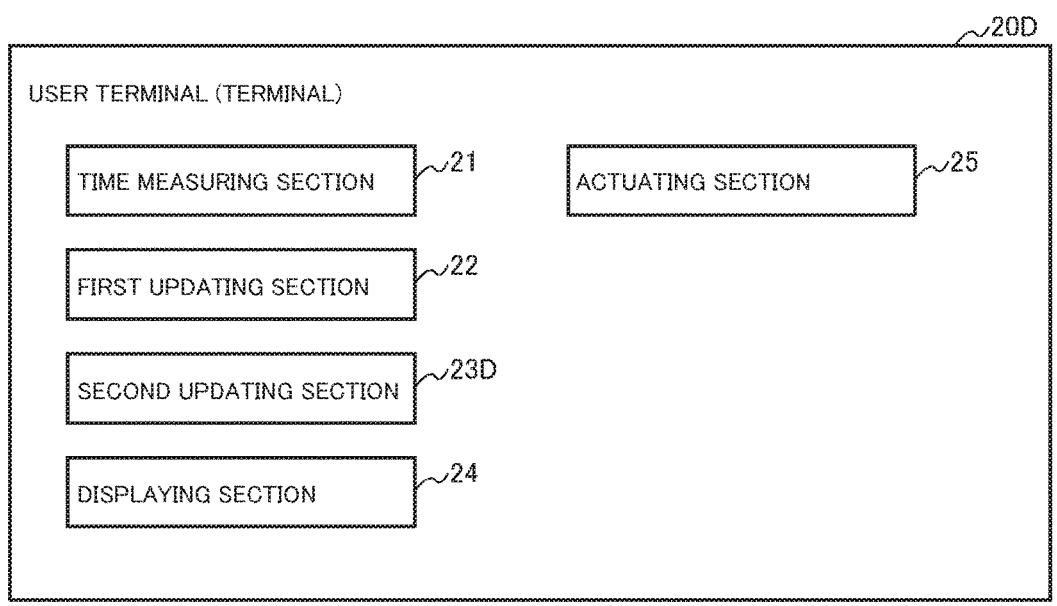
FIG. 10 is a block diagram showing a configuration of the user terminal corresponding to at least one of the embodiments according to the present invention.

FIG. 10 is a block diagram showing a configuration of a user terminal 20D (hereinafter, referred to as a "terminal 20D"), which is an example of the user terminal 20. In the present embodiment, the terminal 20D at least includes a time measuring section 21, a first updating section 22, a second updating section 23D, a displaying section 24, and an actuating section 25.

The actuating section 25 has a function to activate a predetermined effect in a video game on the basis of a situation that a value represented by a second gauge (hereinafter, referred to as a "special value") satisfies a predetermined condition.

Here, a configuration to activate the predetermined effect is not limited particularly. It may be configured so as to automatically activate the predetermined effect when the predetermined condition is satisfied, or maybe configured so as to activate the predetermined effect after waiting a predetermined operation by the player.

The second updating section 23D has a function to subtract a subtracted value corresponding to the predetermined effect activated by the actuating section 25 from the special value.

Here, a configuration to subtract the subtracted value corresponding to the activated effect from the special value is not limited particularly. However, it is preferable that the user can recognize a reason to subtract the subtracted value from the special value. As examples of the configuration to subtract the subtracted value from the special value, there are a configuration in which by referring to information, in which a plurality of effects is associated with the subtracted value, the subtracted value stored so as to be associated with the activated effect is subtracted from the special value, a configuration in which a predetermined value is subtracted from the special value, or a configuration in which the special value is set to a predetermined value (for example, a value at the time to start a battle (initial value) or zero).

Figure 11:
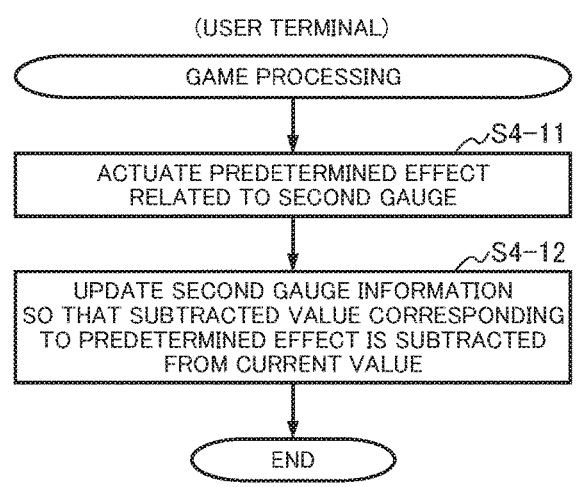
FIG. 11 is a flowchart showing an example of the game processing corresponding to at least one of the embodiments according to the present invention.

FIG. 11 is a flowchart showing an example of the game processing carried out by the terminal 20. Hereinafter, an operation of the terminal 20D will be described as an example. In this regard, an operation of the terminal 20D with the server 10 is omitted from a point of view to avoid repeated explanation.

When the predetermined effect related to the second gauge is activated in accordance with progress of the video game (Step S4-11), the terminal 20D updates the second gauge information so that the subtracted value corresponding to the activated predetermined effect is subtracted from a current special value (hereinafter, referred to as a "current value") (Step S4-12). In the present embodiment, the terminal 20D activates an effect specified by the player, and sets the current value to zero.

As explained above, as one side of the fourth embodiment, the user terminal 20D is configured so as to include the second updating section 23D and the actuating section 25. Thus, the predetermined effect in the video game is activated on the basis of a situation that the special value satisfies the predetermined condition; the subtracted value corresponding to the activated predetermined effect is subtracted from the special value; and the second gauge is caused to influence on progress of the video game. Therefore, it is possible to provide ranges for the configuration of the video game, and this makes it possible to enhance interest.

In this regard, it has not been mentioned particularly in the example of the fourth embodiment described above. However, the user terminal 20D may be configured so as to activate the predetermined effect when an activation condition is satisfied after the special value is reduced. By configuring the user terminal 20D in this manner and so that the special value can be increased again before activation of the predetermined effect, it is possible to provide ranges for the configuration of the video game.

(Fifth Embodiment)

Figure 12:
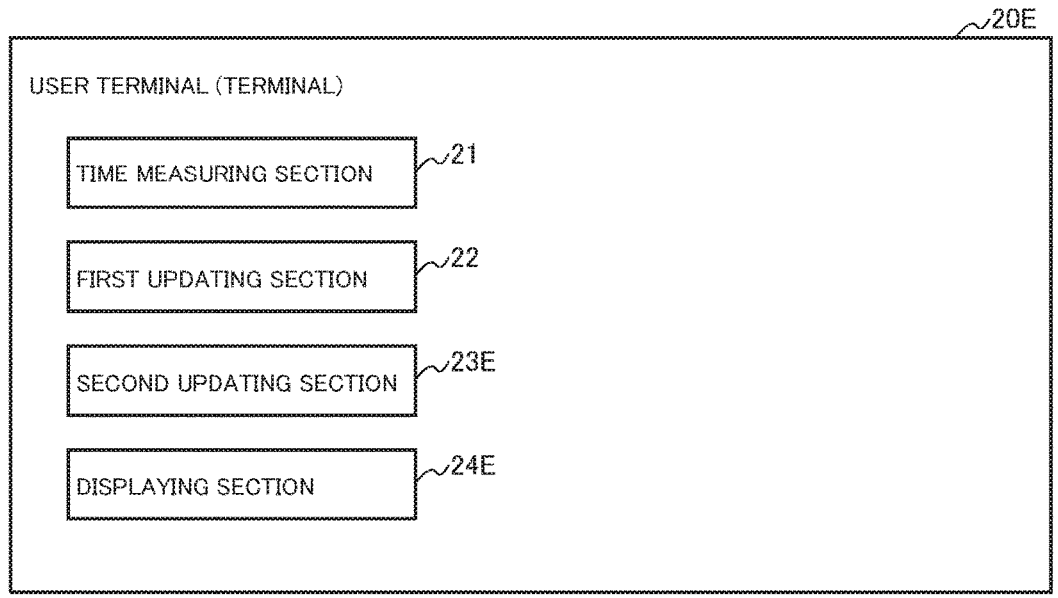
FIG. 12 is a block diagram showing a configuration of the user terminal corresponding to at least one of the embodiments according to the present invention.

FIG. 12 is a block diagram showing a configuration of a user terminal 20E (hereinafter, referred to as a "terminal 20E"), which is an example of the user terminal 20. In the present embodiment, the terminal 20E at least includes a time measuring section 21, a first updating section 22, a second updating section 23E, and a displaying section 24E.

The second updating section 23E has a function to accumulate a predetermined value as one unit on the basis of a situation that a value represented by a second gauge (hereinafter, referred to as a "special value") becomes the predetermined value, and to subtract the predetermined value from the special value.

Here, the configuration is not limited particularly so long as the predetermined value may be a value defined in advance. As an example of the predetermined value, there is a value corresponding to a state that the second gauge is filled up.

Further, the phrase "accumulate a value as one unit" means that when the special value is 100, the special value is set to zero instead of setting the accumulated number to one, for example. In this regard, a relationship between the special value and the accumulated number is not limited particularly. However, it is preferable that there is regularity in the relationship. As examples of the relationship between the special value and the accumulated number, there are a relationship in which a special value is always converted into an accumulated number when the special value becomes a predetermined value and a configuration in which a predetermined value is changed in accordance with an accumulated number (for example, the predetermined value is 100 when the accumulated number is zero, and the predetermined value is 200 when the accumulated number is one).

The displaying section 24E has a function to display, on a display screen, a game screen including an image representing that the predetermined value is accumulated as one unit (hereinafter, referred to as an "accumulated image").

Here, a configuration of the accumulated image is not limited particularly. However, it is preferable that it is a configuration in which the user can recognize the accumulated number. In this regard, an image representing a character string can be included in the accumulated image.

Figure 13:
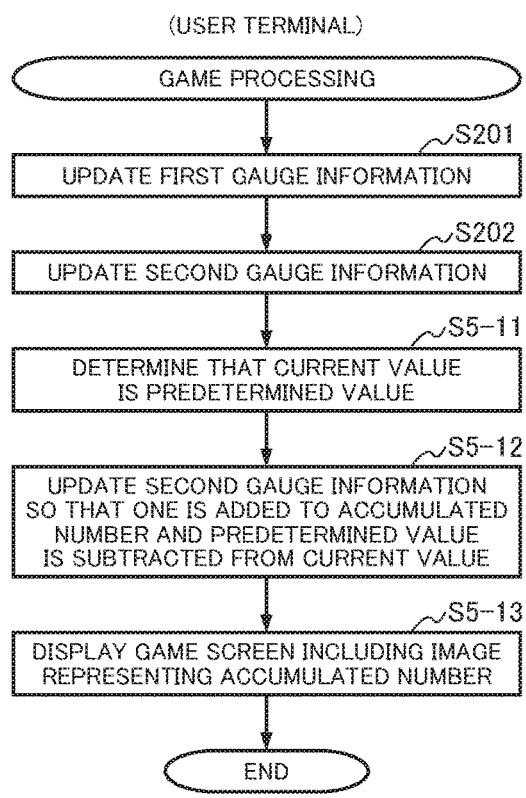
FIG. 13 is a flowchart showing an example of the game processing corresponding to at least one of the embodiments according to the present invention.

FIG. 13 is a flowchart showing an example of the game processing carried out by the terminal 20. Hereinafter, an operation of the terminal 20E will be described as an example. In this regard, an operation of the terminal 20E with the server 10 is omitted from a point of view to avoid repeated explanation.

In a case where it is determined that a current value of the special value is the predetermined value (Step S5-11), the terminal 20E updates the second gauge information so as to add one to the accumulated number and subtract the predetermined value from the current value of the special value (Step S5-12). In the present embodiment, the terminal 20E converts, until the accumulated number reaches an upper limit number, the predetermined value into the accumulated number regardless of an operation of the user when the current value becomes the predetermined value.

When the second gauge information is updated, the terminal 20E displays a game screen including an image that represents the accumulated number (Step S5-13). In the present embodiment, the terminal 20E displays a game screen including the first gauge, the second gauge, and an image representing objects of the same number as the accumulated number.

As explained above, as one side of the fifth embodiment, the user terminal 20E is configured so as to include the second updating section 23E and the displaying section 24E. Thus, the predetermined value is accumulated as one unit on the basis of a situation that the special value becomes the predetermined value; the predetermined value is subtracted from the special value; and the game screen including the image, which represents that the predetermined value is accumulated as one unit is displayed. Therefore, it is possible to provide ranges for a method of using the second gauge, and this makes it possible to improve interest of the video game.

(Sixth Embodiment)

Figure 14:
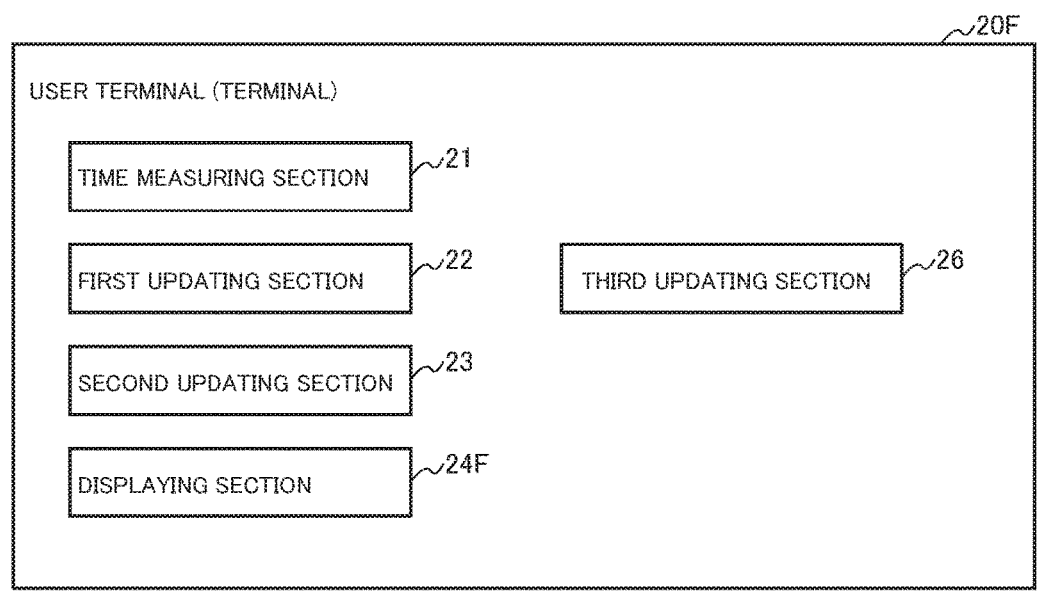
FIG. 14 is a block diagram showing a configuration of the user terminal corresponding to at least one of the embodiments according to the present invention.

FIG. 14 is a block diagram showing a configuration of a user terminal 20F (hereinafter, referred to as a "terminal 20F"), which is an example of the user terminal 20. In the present embodiment, the terminal 20F at least includes a time measuring section 21, a first updating section 22, a second updating section 23, a displaying section 24F, and a third updating section 26.

The displaying section 24F has a function to display a first gauge and a second gauge in different forms at the same time.

Here, a configuration of each of the first gauge and the second gauge is not limited particularly. However, it is preferable that the user can identify each of the gauges. As an example of the first gauge and the second gauge, there is a configuration in which one has a rectangle shape and the other has a circular shape.

The third updating section 26 has a function to update information regarding an in-game element that a character owns in exchange for usage of a value represented by the second gauge (hereinafter, referred to as a "special value").

Here, the in-game element means an element that constitutes the video game. As examples of the in-game element, there are a so-called item and equipment.

Figure 15:
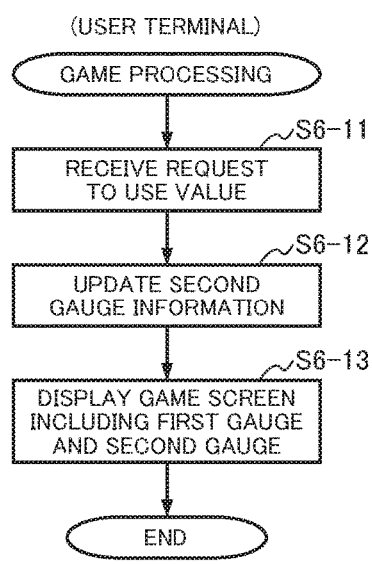
FIG. 15 is a flowchart showing an example of the game processing corresponding to at least one of the embodiments according to the present invention.

FIG. 15 is a flowchart showing an example of the game processing carried out by the terminal 20. Hereinafter, an operation of the terminal 20F will be described as an example. In this regard, an operation of the terminal 20F with the server 10 is omitted from a point of view to avoid repeated explanation.

When a request to use the special value is received (Step S6-11), the terminal 20F updates second gauge information (Step S6-12). In the present embodiment, the terminal 20F determines that the request to use the special value is received in a case where a predetermined operation by the user is received when the special value becomes a predetermined value or more. Further, the terminal 20F updates the second gauge information so as to subtract a value according to the request to use the special value (in the present embodiment, the predetermined value) from a current value.

When the second gauge information is updated, the terminal 20F displays a game screen that includes the first gauge and the second gauge (Step S6-13). In the present embodiment, the terminal 20F displays the game screen that includes the first gauge and the second gauge.

As explained above, as one side of the sixth embodiment, the user terminal 20F is configured so as to include the displaying section 24F. Therefore, by displaying the first gauge and the second gauge in different forms at the same time and displaying two different gauges related to each other in different forms at the same time, it is possible to enhance usefulness of two gauges.

Further, as one side of the sixth embodiment, the user terminal 20F is configured so as to include the third updating section 26. Thus, the information regarding the in-game element that the character owns is updated in exchange for usage of the special value, and a role different from that of the first gauge is applied to the second gauge. This makes it possible to improve interest of the user in the video game.

(Seventh Embodiment)

Figures 16, 17:
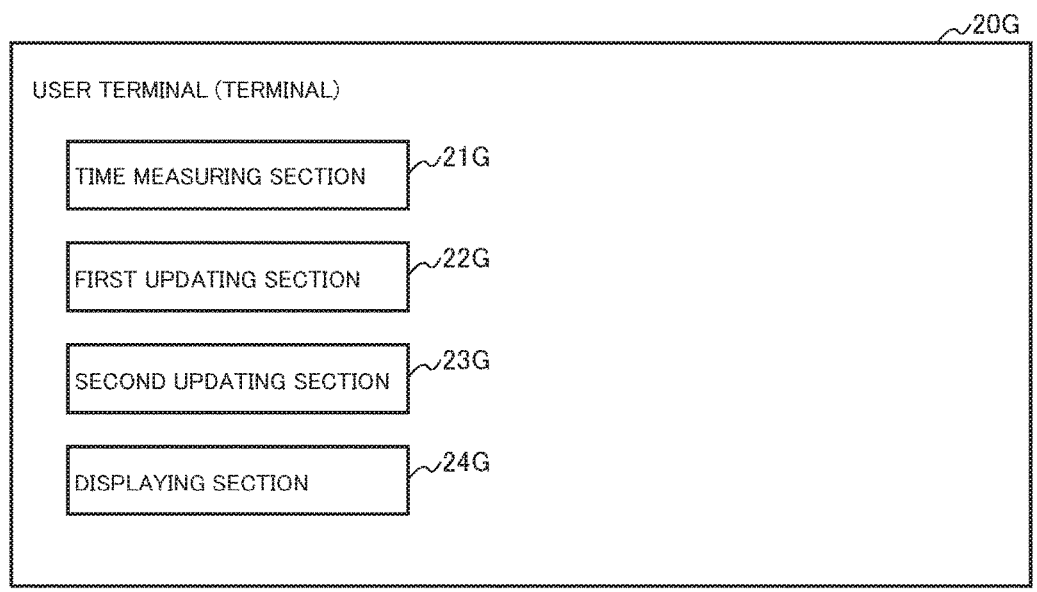
FIG. 16 is a block diagram showing a configuration of the user terminal corresponding to at least one of the embodiments according to the present invention.
FIG. 17 is an explanatory drawing for explaining an example of a storage state of information corresponding to at least one of the embodiments according to the present invention.

FIG. 16 is a block diagram showing a configuration of a user terminal 20G (hereinafter, referred to as a "terminal 20G"), which is an example of the user terminal 20 in the system 100 (see FIG. 1). Hereinafter, the case where progress of a video game (a so-called network game) that proceeds in the terminal 20G provided with a display device is controlled by communicating with the server 10 appropriately will be described as an example.

In the present embodiment, the terminal 20G at least includes a time measuring section 21G, a first updating section 22G, a second updating section 23G, and a displaying section 24G.

The time measuring section 21G has a function to measure an elapsed time for a character that starts an action on the basis of the elapsed time. In the present embodiment, the time measuring section 21G measures a time that elapses during a battle against an enemy character for every character of the user (or the player) who plays the video game by operating the terminal 20G. Namely, the time measuring section 21G may be configured so as to have a function to measure an elapsed time in order to cause a battle between a character of the player (a player character) and an enemy character to proceed as an active time battle (ATB). In this regard, the terminal 20G may be configured so as to convert the elapsed time into a value for a first gauge (ATB value) and accumulate it.

The first updating section 22G has a function to update information regarding a gauge that represents the measured elapsed time (hereinafter, referred to as a "first gauge"). In the present embodiment, the first updating section 22G updates the information so that an effective elapsed time is recorded for each of the player characters.

The second updating section 23G has a function to update information regarding a gauge (hereinafter, referred to as a "second gauge") that represents a value (hereinafter, referred to as a "special value") to be increased in a case where at least a predetermined condition including a situation the first gauge is in a predetermined state is satisfied. In the present embodiment, the second updating section 23G manages a value, for which the minimum value and the maximum value are set up, as the special value. Further, the second updating section 23G accumulates the special value in accordance with the elapse of time when the first gauge is in a state corresponding to the maximum value (a so-called state in which the gauge is filled up).

In this regard, the second updating section 23G temporarily stops accumulating by a condition the same as the condition set up for the first gauge (stop condition). As examples of the stop condition, there are considered various contents including a scene for selection of an object by the player, and a scene in which a predetermined list is displayed.

Further, the second updating section 23G may be configured so as to update the second gauge on the basis of a predetermined condition in addition to the lapse of time. The content of the predetermined condition is not limited particularly. However, it is preferable that the predetermined condition is one regarding the character. As examples of the predetermined condition, there are completion of an action by the character, and accumulation of a damage. In this case, the user terminal 20G may be configured so as to exclude the action carried out using the second gauge from the actions and causes why a damage is received.

FIG. 17 is an explanatory drawing for explaining an example of a storage state of information stored in a storing section (not shown in the drawings) included in the terminal 20G. As shown in FIG. 17, the terminal 20G stores, as the information regarding the gauge (gauge related information), information regarding the first gauge (hereinafter, referred to as "first gauge information") and second gauge information for every character.

Here, the first gauge information contains an elapsed time. A configuration to measure the elapsed time is not limited particularly so long as a start condition to measure a time and an initialization condition for the elapsed time are provided. In the present embodiment, the initialization condition is satisfied when the start condition is satisfied during the battle and the character is operated.

Further, the second gauge information contains a special value and the accumulated number. The minimum value and the maximum value of the special value are 0 and 300, respectively. When the special value becomes 100, the player or the character is allowed to activate a predetermined effect. As a UI, the accumulated number (stock) becomes one when the special value becomes 100, whereby the second gauge looks like an initialized state.

The displaying section 24G has a function to cause the display device to display, on a display screen, a game screen including at least one of the first gauge and the second gauge. In the present embodiment, the displaying section 24G displays a game screen including the first gauge and the second gauge.

Figure 18:
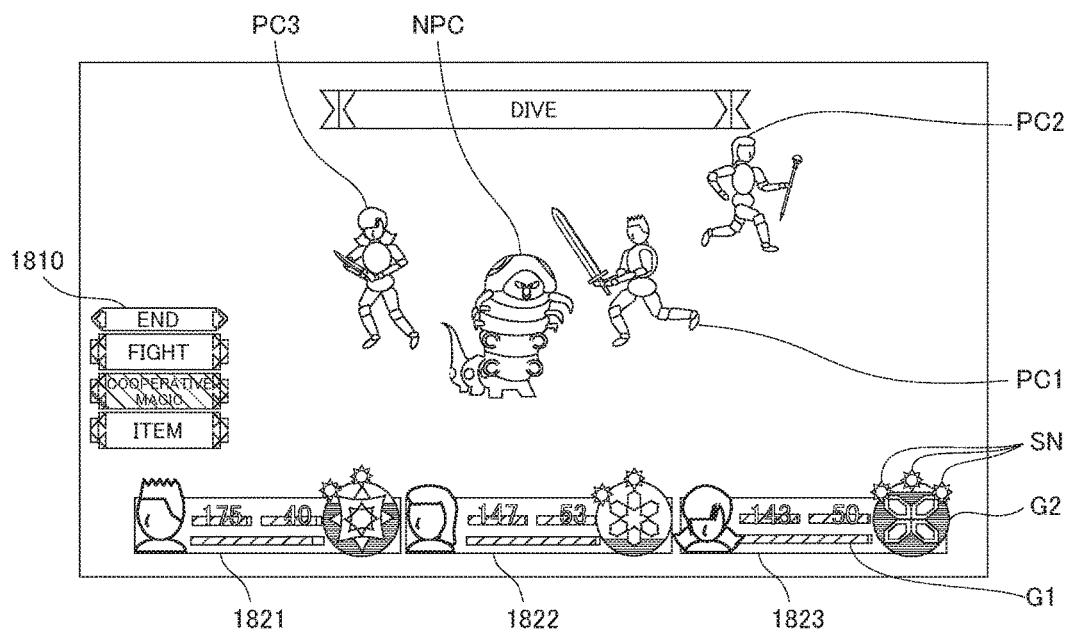
FIG. 18 is an explanatory drawing for explaining an example of a game screen corresponding to at least one of the embodiments according to the present invention.

FIG. 18 is an explanatory drawing for explaining an example of the game screen. As shown in FIG. 18, a plurality of player characters PC1, PC2, PC3, an enemy character NPC, a command display area 1810, and a plurality of status display areas 1821, 1822, 1823 corresponding to the respective player characters are displayed in the game screen.

An image regarding a state (or status) of the corresponding player character, which includes the first gauge and the second gauge is displayed in each of the status display areas. For example, a first gauge G1, a second gauge G2, and an image SN representing the accumulated number are displayed in the status display area 1823 corresponding to the player character PC3.

The first gauge is filled up from a left end toward a right end in a rectangle frame in accordance with the elapsed time. On the other hand, the second gauge is filled up from a bottom side toward a top side in a circular frame in accordance with the elapsed time. In this regard, the user terminal 20G maybe configured so that a form of each of the first and second gauges is different from each other in accordance with length of the elapsed time required for the action, for example.

The image that represents the accumulated number is not limited particularly so long as it is configured so that the player can recognize the accumulated number. In the present embodiment, predetermined images of the same number as the accumulated number are displayed.

Figure 19:
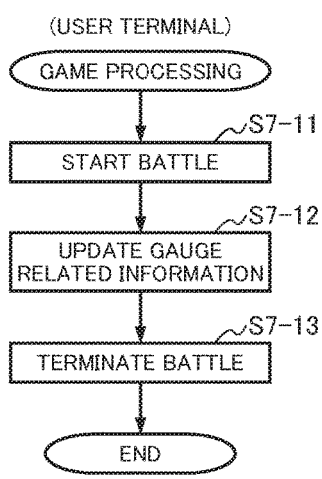
FIG. 19 is a flowchart showing an example of the game processing corresponding to at least one of the embodiments according to the present invention.

FIG. 19 is a flowchart showing an example of processing related to a video game (game processing) carried out by the terminal 20G. Hereinafter, an operation of the terminal 20G will be described as an example. In this regard, an operation of the user terminal 20G with the server 10 is omitted from a point of view to avoid repeated explanation.

In the game processing, the terminal 20G starts a battle (Step S7-11). In the present embodiment, the terminal 20G starts a battle between a player character and an enemy character on the basis of a battle start condition between the player character and the enemy character is satisfied.

When the battle is started, the terminal 20G updates the gauge related information on the basis of a progress status of the battle and an elapsed time Step S6-12). In the present embodiment, the terminal 20G increases the first gauge or the second gauge on the basis of the elapsed time; initializes the first gauge by means of an action of the character; and initializes the second gauge by means of activation of a predetermined effect or subtracts the accumulated number therefrom.

Here, an example of the predetermined effect will be described. In the present embodiment, the user terminal 20G determines a person or character carrying out an action and a state of the second gauge for the character, which is an action target, at timing when to determine an action of the character (for example, timing when a command is selected by the player). More specifically, the user terminal 20G determines whether the second gauge becomes a predetermined number or higher and whether there is an effect that becomes effective. In this regard, in order to use an effect related to a plurality of characters (cooperation skill), such an effect occurs only in a case where the second gauges of all participants become the predetermined value or higher.

Further, an occurrence method of a predetermined effect includes natural occurrence and input occurrence. The natural occurrence is an effect that occurs regardless of an operation of the player on the basis of a condition regarding a status or a probability. As an example of the natural occurrence, there is an effect that occurs with a probability calculated using a probability set up for the character or the effect and the number of actions that the character carries out. Further, the input occurrence is an effect that occurs on the basis of an operation of the player. As an example of the input occurrence, there is an effect that occurs when an icon is displayed on the basis of a situation that a condition is satisfied and the player selects the icon.

When a termination condition is satisfied in the battle, the terminal 20G terminates the battle (Step S6-13). In the present embodiment, when an HP of all of the player characters or an HP of all of the enemy characters becomes zero, the terminal 20G carries out a process to terminate the battle.

As explained above, as one side of the seventh embodiment, the user terminal 20G provided with the functions to control progress of the video game in response to an operation of the user is configured so as to include the time measuring section 21G, the first updating section 22G, the second updating section 23G, and the displaying section 24G. Thus, the elapsed time of the character that starts an action is measured on the basis of the elapsed time, the information regarding the gauge (the first gauge) representing the measured elapsed time is updated, the information regarding the gauge (the second gauge) representing the value to be increased in a case where the predetermined condition including the condition that at least the first gauge is in the predetermined state is satisfied is updated, and the display device is caused to display the game screen including at least one of the first gauge and the second gauge on the display screen. This makes it possible to improve interest of the ATB system.

In this regard, as one side of the seventh embodiment, the user terminal 20G may be configured so as to: compare a damage that the user or the character operated by the user applies to the enemy character with a remaining HP of the enemy character; and give a privilege to the user in a case where a comparison result satisfies a coincidence condition. In this case, the user terminal 20G may be configured so that a privilege associated with a range (just kill privilege) is given to the user in a case where a total damage amount that the user applies to an enemy character is in a range of 100% to 105% of the HP of the enemy character, but the privilege is not given to the user in a case where the total damage amount is 106% or more, for example. Moreover, the user terminal 20G may be configured so that when other condition than the condition that the HP of the enemy character becomes zero on the basis of the action of the player character is satisfied (for example, the remaining HP becomes 5%), the battle is terminated by regarding as a situation that the HP of the enemy character becomes zero, and the just kill privilege is not given to the user.

In this regard, as one side of the seventh embodiment, the user terminal 20G may be configured so as to allow the user to use an item, by which a state of the character is temporarily changed, before at least a battle against an enemy character is started; and set up, when a request to use the item is received, the state of the character to a state corresponding to the item by a fixed period. In this case, the user terminal 20G may be configured so that characters whose target is not determined (or established) at the time of using the item (for example, the player character that participates in the battle, and an enemy character that the player character will encounter in the future) are contained in the characters to which the effect is reflected in accordance with a kind of the item.

As explained above, one or two or more shortages can be solved by each of the embodiments of the present application. In this regard, the effects according to each of the embodiments are non-limiting effects or one example of the non-limiting effects.

In this regard, in each of the embodiments described above, each of the plurality of user terminals 20 and 201 to 20N and the server 10 carries out the various kinds of processing described above in accordance with various kinds of control programs (for example, a video game processing program) stored in the storage device with which the corresponding terminal or server is provided.

Further, a configuration of the system 100 is limited to the configuration that has been explained as an example of each of the embodiments described above. For example, the system 100 may be configured so that part or all of the processing that has been explained as the processing carried out by the user terminal is carried out by the server 10, or it maybe configured so that part or all of the processing that has been explained as the processing carried out by the server 10 is carried out by any of the plurality of user terminals 20 and 201 to 20N (for example, the user terminal 20). Further, the system 100 may be configured so that a part or all of the storing sections included by the server 10 is included in any of the plurality of user terminals 20 and 201 to 20N. Namely, the system 100 may be configured so that a part or all of the functions included in any one of the user terminal 20 and the server 10 according to the system 100 is included in the other.

Further, the program may be configured so as to cause a single apparatus that does not include a communication network to realize a part or all of the functions that have been explained as the examples of the respective embodiments described above.

In this regard, the word "in accordance with progress of the video game" means that occurrence of various kinds of progress or changes and the like that can be generated in the video game becomes timing or a standard of a specific process. As examples of the specific process, there are a determining process, an information updating process, and the like. Further, as examples of the various kinds of progress or changes that can be generated in the video game, there are progress of time, a change in a game element value, a specific status or update of a flag, an operation input by the user, and the like.

(APPENDIX)

The explanation of the embodiments described above has been described so that the following inventions can be at least realized by a person having a normal skill in the art to which the present invention belongs.

(1)

A non-transitory computer-readable medium including a video game processing program product for causing a user terminal to realize functions to control progress of a video game in response to an operation of a user,
wherein the functions include:
a time measuring function configured to measure an elapsed time for a character on the basis of the elapsed time, the character starting an action;
a first updating function configured to update information regarding a gauge (hereinafter, referred to as a "first gauge"), the first gauge representing the elapsed time measured by the time measuring function;
a second updating function configured to update information regarding a gauge (hereinafter, referred to as a "second gauge"), the second gauge representing a value to be increased in a case where a predetermined condition is satisfied, the predetermined condition including a condition that at least the first gauge is in a predetermined state; and
a displaying function configured to display a game screen on a display screen of a display device, at least one of the first gauge and the second gauge being included in the game screen.

(2)

The non-transitory computer-readable medium according to (1),
wherein the displaying function includes a function configured to display the first gauge and the second gauge in different forms at the same time.

(3)

The non-transitory computer-readable medium according to (1) or (2),
wherein the first updating function includes a function configured to reduce the elapsed time on the basis of a situation that an action starting request for the character is received, and
wherein the second updating function includes a function configured to increase the value in accordance with a predetermined rule until the elapsed time becomes less than a predetermined time after the elapsed time became the predetermined time.

(4)

The non-transitory computer-readable medium according to any one of (1) to (3),
wherein the second updating function includes a function configured to increase the value by an amount calculated in accordance with a lapse of time on the basis of a situation that the predetermined condition is satisfied.

(5)

The non-transitory computer-readable medium according to any one of (1) to (4),
wherein the functions further include:
an activating function configured to activate a predetermined effect in the video game on the basis of a situation that the value satisfies a predetermined condition, and
wherein the second updating function includes a function configured to subtract a subtracted value from the value, the subtracted value corresponding to the predetermined effect activated by the activating function.

(6)

The non-transitory computer-readable medium according to any one of (1) to (5),
wherein the second updating function includes a function configured to accumulate a predetermined value as one unit on the basis of a situation that the value becomes the predetermined value, and to subtract the predetermined value from the value, and
wherein the displaying function includes a function configured to display a game screen on the display screen, the game screen including an image in which the predetermined value is accumulated as one unit.

(7)

The non-transitory computer-readable medium according to any one of (1) to (6),
wherein the functions further include:
a third updating function configured to update information regarding an in-game element, the character owning the in-game element in exchange for usage of the value.

(8)

The non-transitory computer-readable medium according to any one of (1) to (7),
wherein the functions further include:
a giving function configured to compare a damage that the user or the character operated by the user applies to an enemy character with a remaining HP of the enemy character, and to give a privilege to the user in a case where a comparison result satisfies a coincidence condition.

(9)

The non-transitory computer-readable medium according to any one of (1) to (8),
wherein the functions further include:
an allowing function configured to allow the user to use an item by which a state of the character is temporarily changed at least before a battle against an enemy character is started; and
a setting function configured to set up the state of the character to a state corresponding to the item by a fixed period when to receive a request to use the item.

(10)

A non-transitory computer-readable medium including a video game processing program product for causing a server to realize at least one function of the functions that the video game processing program product described in any one of (1) to (9) causes the user terminal to realize, the server being capable of communicating with the user terminal.

(11)

A user terminal into which the video game processing program product included in the non-transitory computer-readable medium according to any one of (1) to (10) is installed.

(12)

A video game processing system for controlling progress of a video game in response to an operation of a user, the video game processing system including a communication network, a server, and a user terminal, the video game processing system comprising:

a time measuring section configured to measure an elapsed time for a character on the basis of the elapsed time, the character starting an action;

a first updating section configured to update information regarding a gauge (hereinafter, referred to as a "first gauge"), the first gauge representing the elapsed time measured by the time measuring function;

a second updating section configured to update information regarding a gauge (hereinafter, referred to as a "second gauge"), the second gauge representing a value to be increased in a case where a predetermined condition is satisfied, the predetermined condition including a condition that at least the first gauge is in a predetermined state; and a displaying section configured to display a game screen on a display screen of a display device, at least one of the first gauge and the second gauge being included in the game screen.

(13)

The video game processing system according to (12), wherein the server includes the time measuring section, the first updating section, and the second updating section, and wherein the user terminal includes:

a receiving section configured to receive information for outputting the game screen on the display screen of the display device.

(14)

A non-transitory computer-readable medium including a video game processing program product for causing a server to realize functions to control progress of a video game in response to an operation of a user, wherein the functions include:

a time measuring function configured to measure an elapsed time for a character on the basis of the elapsed time, the character starting an action;

a first updating function configured to update information regarding a gauge (hereinafter, referred to as a "first gauge"), the first gauge representing the elapsed time measured by the time measuring function;

a second updating function configured to update information regarding a gauge (hereinafter, referred to as a "second gauge"), the second gauge representing a value to be increased in a case where a predetermined condition is satisfied, the predetermined condition including a condition that at least the first gauge is in a predetermined state; and a displaying function configured to cause a display device to display a game screen on a display screen thereof, at least one of the first gauge and the second gauge being included in the game screen.

(15)

A non-transitory computer-readable medium including a video game processing program product for causing a user terminal to realize functions to control progress of a video game in response to an operation of a user, wherein a server includes:

a time measuring function configured to measure an elapsed time for a character on the basis of the elapsed time, the character starting an action;

a first updating function configured to update information regarding a gauge (hereinafter, referred to as a "first gauge"), the first gauge representing the elapsed time measured by the time measuring function;

a second updating function configured to update information regarding a gauge (hereinafter, referred to as a "second gauge"), the second gauge representing a value to be increased in a case where a predetermined condition is satisfied, the predetermined condition including a condition that at least the first gauge is in a predetermined state; and a displaying function configured to display a game screen on a display screen of a display device, at least one of the first gauge and the second gauge being included in the game screen, and wherein the functions includes:

a receiving function configured to receive, from the server, information for outputting the game screen on the display screen of the display device.

(16)

A non-transitory computer-readable medium including a video game processing program product for causing a user terminal to realize at least one function of the functions that the video game processing program product included in the non-transitory computer-readable medium according to (14) causes the server to realize, the user terminal being capable of communicating with the server.

(17)

A server into which the video game processing program included in the non-transitory computer-readable medium according to any one of (14) to (16) is installed.

(18)

A video game processing method of controlling progress of a video game in response to an operation of a user, the video game processing method comprising:

a time measuring process configured to measure an elapsed time for a character on the basis of the elapsed time, the character starting an action;

a first updating process configured to update information regarding a gauge (hereinafter, referred to as a "first gauge"), the first gauge representing the elapsed time measured in the time measuring process;

a second updating process configured to update information regarding a gauge (hereinafter, referred to as a "second gauge"), the second gauge representing a value to be increased in a case where a predetermined condition is satisfied, the predetermined condition including a condition that at least the first gauge is in a predetermined state; and a displaying process configured to display a game screen on a display screen of a display device, at least one of the first gauge and the second gauge being included in the game screen.

(19)

A video game processing method carried out by a video game processing system for controlling progress of a video game in response to an operation of a user, the video game processing system comprising a communication network, an server, and a user terminal, the video game processing method comprising:

a time measuring process configured to measure an elapsed time for a character on the basis of the elapsed time, the character starting an action;

a first updating process configured to update information regarding a gauge (hereinafter, referred to as a "first gauge"), the first gauge representing the elapsed time measured in the time measuring process;

a second updating process configured to update information regarding a gauge (hereinafter, referred to as a "second gauge"), the second gauge representing a value to be increased in a case where a predetermined condition is satisfied, the predetermined condition including a condition that at least the first gauge is in a predetermined state; and a displaying process configured to display a game screen on a display screen of a display device, at least one of the first gauge and the second gauge being included in the game screen.

According to one of the embodiments of the present invention, it is useful to improve interest of an ATB system.

What is claimed is:

1. A non-transitory computer-readable medium including a video game processing program product for causing a user terminal to control progress of a video game in response to an operation of a user, the video game processing program product, when executed, causing the user terminal to perform operations comprising:
    measuring an elapsed time for a character from a time when the character starts an action, the action including a battle between the character and an enemy character;
    updating first information regarding a first gauge, the first gauge representing the elapsed time and being accumulated in accordance with the elapsed time;
    updating second information regarding a second gauge, the second gauge representing a value to be increased in a case where a predetermined condition is satisfied, the predetermined condition including a condition that at least the first gauge is in a predetermined state;
    reducing the first gauge when an action starting request for the character is received; and
    displaying a game screen on a display screen of a display device, at least one of the first gauge and the second gauge being included in the game screen.

2. The non-transitory computer-readable medium according to claim 1,
    wherein the elapsed time is reduced when the action starting request for the character is received, and
    the value represented by the second gauge is increased in accordance with a predetermined rule until the elapsed time is reduced to be less than a predetermined time, after the elapsed time is measured to be more than the predetermined time.

3. The non-transitory computer-readable medium according to claim 1,
    the value represented by the second gauge is increased by an amount calculated in accordance with a lapse of time from when the predetermined condition is satisfied.

4. The non-transitory computer-readable medium according to claim 1, the operations further comprising:
    activating a predetermined effect in the video game when the value represented by the second gauge satisfies a predetermined condition,
    wherein a subtracted value is subtracted from the value represented by the second gauge, the subtracted value corresponding to the predetermined effect.

5. The non-transitory computer-readable medium according to claim 1,
    wherein a predetermined value is accumulated as one unit when the value to be increased becomes the predetermined value, and to then update the second information so as to subtract the predetermined value from the value to be increased, and
    the game screen includes an image in which the predetermined value is accumulated as one unit.

6. The non-transitory computer-readable medium according to claim 1,
    wherein the first gauge and the second gauge are displayed in different forms at a same time.

7. The non-transitory computer-readable medium according to claim 1, the operations further comprising:
    updating third information regarding an in-game element, the character owning the in-game element in exchange for usage of the value represented by the second gauge.

8. The non-transitory computer-readable medium according to claim 1, the operations further comprising:
    comparing a damage that the user or the character operated by the user applies to the enemy character with a remaining HP of the enemy character; and
    giving a privilege to the user or the character operated by the user in a case where a comparison result satisfies a coincidence condition.

9. The non-transitory computer-readable medium according to claim 1, the operations further comprising:
    allowing the user to use an item by which a state of the character is temporarily changed at least before the battle against the enemy character is started; and
    setting up a state of the character correspond to the item by a fixed period when a request to use the item is received.

10. A non-transitory computer-readable medium including a video game processing program product for causing a server to realize at least one operation of the operations that the video game processing program product in claim 1 causes the user terminal to perform, the server being capable of communicating with the user terminal.

11. A user terminal into which the video game processing program product included in the non-transitory computer-readable medium according to claim 1 is installed.

12. A video game processing system for controlling progress of a video game in response to an operation of a user, the video game processing system comprising:
    a server connected to a communication network; and
    a user terminal connected to the communication network,
    wherein the progress of the video game is controlled by the user terminal communicating with the server via the communication network,
    one of the server and the user terminal is configured to measure an elapsed time for a character from a time when the character starts an action, the action including a battle between the character and an enemy character;
    one of the server and the user terminal is configured to update first information regarding a first gauge, the first gauge representing the elapsed time and being accumulated in accordance with the elapsed time;
    one of the server and the user terminal is configured to update second information regarding a second gauge, the second gauge representing a value to be increased in a case where a predetermined condition is satisfied, the predetermined condition including a condition that at least the first gauge is in a predetermined state;
    one of the server and the user terminal is configured to reduce the first gauge when an action starting request for the character is received; and
    one of the server and the user terminal is configured to display a game screen on a display screen of a display device, at least one of the first gauge and the second gauge being included in the game screen.

13. A video game processing method of controlling progress of a video game in response to an operation of a user, the video game processing method comprising:
    measuring an elapsed time for a character from a time when the character starts an action, the action including a battle between the character and an enemy character;
    updating first information regarding a first gauge, the first gauge representing the elapsed time and being accumulated in accordance with the elapsed time;

updating second information regarding a second gauge, the second gauge representing a value to be increased in a case where a predetermined condition is satisfied, the predetermined condition including a condition that at least the first gauge is in a predetermined state;

reducing the first gauge when an action starting request for the character is received; and displaying a game screen on a display screen of a display device, at least one of the first gauge and the second gauge being included in the game screen.

* * * * *

UNITED STATES PATENT AND TRADEMARK OFFICE
CERTIFICATE OF CORRECTION

PATENT NO. : 10,159,899 B2
APPLICATION NO. : 15/350495
DATED : December 25, 2018
INVENTOR(S) : Atsushi Hashimoto It is certified that error appears in the above-identified patent and that said Letters Patent is hereby corrected as shown below:

In the Claims

At Column 22, Line 17 (Claim 9, Line 6), please change "character correspond" to --character to correspond--.

Signed and Sealed this
Eighteenth Day of June, 2019

Andrei Iancu
*Director of the United States Patent and Trademark Office*